Dec. 16, 1947.  T. J. SMULSKI  2,432,691
WINDSHIELD WIPER BLADE CONNECTOR
Filed Feb. 22, 1944
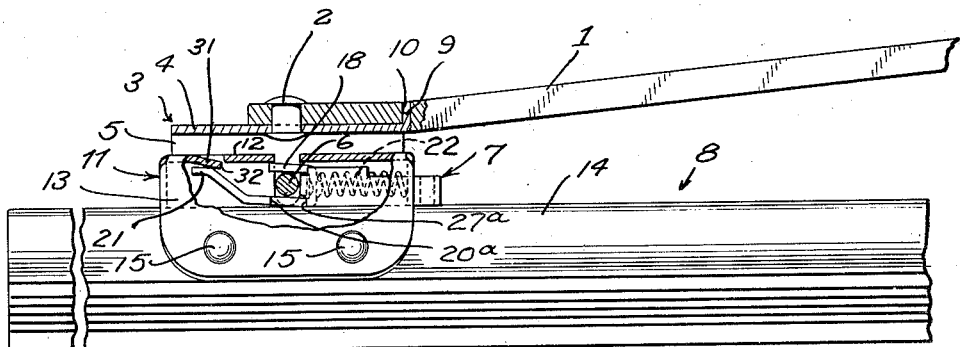
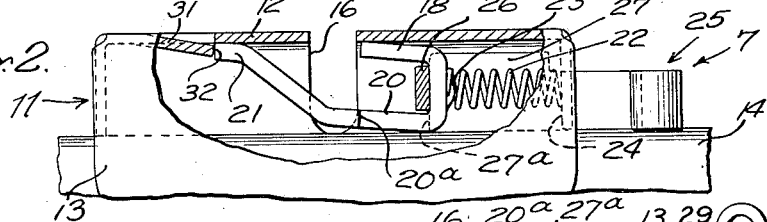
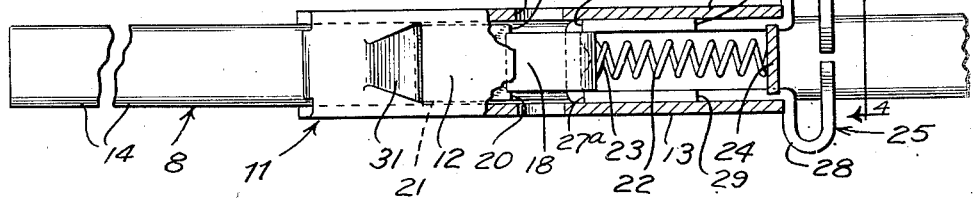
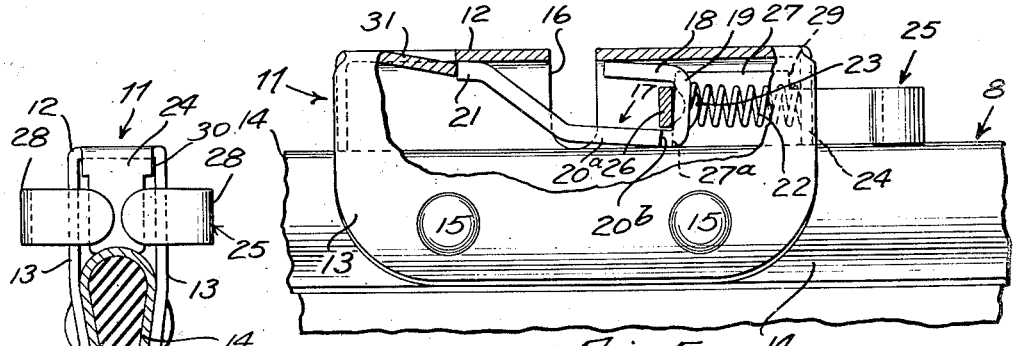
INVENTOR
THEODORE J. SMULSKI
BY Clarence M. Crews
ATTORNEY Patented Dec. 16, 1947

2,432,691

UNITED STATES PATENT OFFICE 2,432,691

WINDSHIELD WIPER BLADE CONNECTOR

Theodore J. Smulski, Gary, Ind., assignor to Productive Inventions, Inc., a corporation of Indiana Application February 22, 1944, Serial No. 523,445

10 Claims. (Cl. 15—250)

This invention relates to mechanism for connecting a windshield wiper blade to the outer end of a windshield wiper arm, and is in the nature of an improvement upon the invention disclosed and claimed in my application Serial No. 432,377, filed February 26, 1942, for Automatic blade clips, the subject matter of the latter application having been transferred to my copending application Serial No. 530,628, filed April 12, 1944. Other types or forms of connectors or clips are disclosed and claimed in my copending applications Serial No. 492,252, filed June 25, 1943, for Windshield wiper arm and blade connectors; Serial No. 662,862, filed April 17, 1946, for Means for connecting a windshield wiper unit to an arm unit; and in an application of John W. Anderson, Serial No. 673,098, filed May 29, 1946, for Connection means between operating and operated units, owned by my assignee.

In the prior application referred to, disclosure is made of a connector mechanism for connecting the arm and blade members of a windshield wiper, including a cross connector affixed to one of the members, and connector apparatus, cooperative with the cross connector, affixed to the other member.

The connector apparatus disclosed in said prior application comprises a body member or clip having a notch for receiving the cross connector. A locking member is carried by the body member for movement transversely of the notch between a locking position in which it projects across the notch entrance and positively blocks the notch entrance, and an unlocking position in which it stands clear of the notch. A trigger member is provided which is rockingly connected with the locking member and is engaged by a spring which urges it in a direction to move the locking member to locking position. The trigger member and body member have cooperative parts for detaining the trigger member cocked in unlocking position. A cocking handle is provided, unitary with the locking member, for operating the locking member from locking to unlocking position against the force of the spring, and for concomitantly shifting and rocking the trigger member to its cocked position as an incident of such operation to detain the locking member in unlocking position. The trigger member includes a tripping portion which extends across the inner portion of the notch when in cocked condition, in position to be engaged and rocked by the cross connector to trip the trigger member when the cross connector is inserted in the notch and pressed against said tripping portion. The spring, acting through the trigger member, thereupon projects the locking member to locking position.

The construction just referred to is very practical and satisfactory when used in the intended manner. It affords a means for automatically and instantaneously effecting a positively locked connection between the blade and wiper arm members in response to the mere insertion of the cross connector into the notch, and engagement of it with the trigger member to trip the latter.

This prior construction, however, is subject to one drawback, namely, that the user of the apparatus sometimes does not understand that the cocking handle which forms part of the locking member is intended to remain in a retracted position when the notch is open. Seeing it in an abnormal position, he is likely to attempt to thrust it to the position which it normally occupies when the apparatus is in locking condition, and when he finds that it does not give, he applies to it sufficient force to deform and damage the trigger member and render the trigger member incapable of further operation in the intended manner. The trigger member is susceptible to such damage by reason of the fact that it is formed as an angle lever, one end of which is caught and detained for holding the locking member in unlocking position, and the other end of which is engaged by the locking and handle member. When the uninformed user seeks improperly to restore the handle to the normal or locking position, the force applied tends to deform the trigger member in the angular part thereof, and it is well within the capability of a man of ordinary strength to effect such deformation.

The primary object of the present invention is to provide a novel construction in which all of the advantages of the prior apparatus are realized, but the drawback referred to is eliminated.

With this object in view, the functions of the trigger and the lock are desirably combined into a single member, upon which the spring acts directly and the cocking handle is made as a separate piece, the arrangement being such that the handle may be operated to withdraw the combined trigger and locking member from locking position and to cock it in the unlocking position, but may not thereafter be engaged with such member in a manner to deform it.

This object is advantageously achieved in accordance with one practical embodiment of the invention by providing a one-way operating connection between the handle member and the locking member for retracting the locking member, and lost motion between the handle member and the locking member when the latter is detained in unlocked position, such lost motion being equal in extent to at least the normal stroke of the handle member, so that the handle member can be freely returned to its normal position without putting any pressure whatever upon the combined trigger and locking member.

In accordance with another practical and adadvantageous embodiment of the invention, the handle member may be engaged by the detained trigger and locking member to prevent restoration of the handle member to its normal position and to keep it retracted, but the parts are so contrived that any restoring force manually applied to the handle member is not transmitted to the trigger and locking member through an angular portion of the latter but directly to the base portion thereof, so that there is no tendency to produce disabling deformation of the trigger and locking member. This latter form of construction has the advantage that the user of the apparatus who correctly understands its structure and mode of operation is informed by observing the handle in retracted position that the locking member is detained in the unlocking position.

Other objects and advantages will hereinafter appear.

In the drawing forming part of this specification

Figure 1 is a fragmentary view, in side elevation, partly broken away, and broken away intermediate its ends for compactness of illustration, showing wiper blade and wiper arm members connected through novel connector mechanism embodying the invention;

Figure 2 is an enlarged detail fragmentary view, partly broken away, illustrating the parts of the connector apparatus in an unlocking condition;

Figure 3 is a fragmentary view, in front elevation, partly broken away, and broken away intermediate its ends for compactness of illustration, showing the mechanism of Figure 1;

Figure 4 is a sectional view taken on the line 4—4 of Figure 3, looking in the direction of the arrows; and Figure 5 is a view similar to Figure 2 which illustrates another form of mechanism embodying the invention.

In the ensuing description, the entire connector structure, including both arm and blade carried parts, will be referred to as connector mechanism, and for the purpose of differentiation the connector parts illustrated as permanently connected to the wiper blade will be collectively referred to as connector apparatus.

In Figs. 1 to 4 of the drawing, a wiper arm member 1 is illustrated, which may constitute the outer or terminal section of a wiper arm of any conventional or usual construction, and which has affixed to it, by means of a rivet 2, a U-shaped hanger 3 which forms a part of the connector mechanism. The hanger 3 comprises a base portion 4 and parallel rearwardly extending side walls 5. A cross pin or rivet 6 is affixed to the side walls 5 to extend across the channel of the hanger 3 and constitute a cross connector through which a pivotal connection may be established with connector apparatus 7 affixed to a wiper blade 8. The hanger 4, as illustrated, is provided with a finger 9 which fits into an opening 10 of arm member 1 for restraining the hanger against rotation or oscillation relative to the arm member.

The connector apparatus comprises a U-shaped clip 11 which includes a body portion 12 and parallel side walls 13. The side walls 13 embrace a rigid frame member 14 of the wiper blade 8, and rivets 15 are passed through the side walls 13 and through the blade frame 14 for permanently securing the clip 11 in fixed relation to the wiper blade 8. The clip 11 is formed with a notch 16 which extends through the base portion 12 and into the side walls 13 of the clip for the reception of the cross connector 6.

A combined trigger and locking or detaining member 17 is disposed within the channel of the clip between the base portion 12 and the blade frame 14. The combined locking and trigger member comprises a locking or detaining arm 18, connecting body 19, and a tripping or base arm 20. The tripping arm 20 includes a base portion which extends parallel to the locking arm 18, a forwardly inclined portion, and a terminal detaining nose 21. The tripping arm 20 is made broad enough substantially to extend across the space between the side walls 13 throughout the major portion of its length, but is made narrower throughout a portion adjacent the body 19, shoulders 20a being formed at the junction of the wide and narrow portions. The locking arm 18 and the body 19 are desirably of the same width as the narrower portion of the tripping arm 20. A compression coil spring 22 is provided for urging the locking member 17 toward locking position, the position illustrated in Figure 1. The spring 22 bears at one end against a boss 23 formed on the body portion 19 of the locking member 17, and at the other end against an end ear 24 which is folded rearwardly from the body portion 12 of the clip 11.

A cocking handle 25 is provided for withdrawing the locking member from the locking position illustrated in Figure 1, and causing it to become cocked or detained in the unlocking position illustrated in Figure 3. The cocking handle is made in the form of a yoke. It comprises a cross body portion 26 which extends through the locking member between the arms 18 and 20 and below the portion 19, side arms 27 which embrace the body 19 of the locking member 17 and extend upwardly adjacent to the side walls 13 of the clip 11, and terminal curved handle forming members 28 which are disposed externally of the clip 11 beyond the upper end ear 24 thereof.

The side arms 27 project to the front and rear of the body portion 26, shoulders 27a being formed in line with the shoulders 20a of the tripping arm 20.

As will be evident from an inspection and comparison of Figures 3 and 4, upward movement of the cocking handle is limited by engagement of shoulder portions 29 of the side arms 27 with side marginal portions 30 of the ear 24, which lie adjacent the body portion 12 of the clip 11.

The body portion 26 of the cocking handle is canted somewhat so that it engages the body portion of the locking member 17 at a point forwardly of the axial line of thrust of the spring 22. Thus, when the parts are in the positions shown in Figure 1, and the cocking handle is drawn upward, (toward the right as viewed in Figure 1), the line of pull of the cocking handle upon the locking member is located forwardly of the line of thrust of the spring 22 upon the locking member, so that the tendency of the cocking handle is to tilt the locking member forward (in a clockwise direction as viewed in Figure 1). This tilting is resisted by engagement of the nose 21 with the forward face of an inclined tab or ear 31 which is displaced rearwardly from the body 12 of the clip 11. The tendency to tilt persists, however, as the handle draws the locking member upward, and as soon as the nose 21 clears the edge of the tab 31 it springs upward across the upper end face 32 of the tab and is detained by engagement with said end face against return to the locking position.

Since the spring 22 acts directly upon the locking member 17, there is no tendency of the spring 22 to affect the cocking handle so long as the locking member is detained by the ear 21 in its unlocking position as shown in Figure 2.

The cocking handle, when it has performed its retracting function, can simply be released, or it can be manually returned to the position in which it is illustrated in Figs. 1 and 3, without disturbing the locking member and without putting any strain on any of the parts of the locking member. The parts 18 and 19 lie completely between the planes of the inner surfaces of side arms 27, and the same thing is true of the narrow portion of tripping arm 20, the shoulders 20a being too far removed from the base 19 of the locking member 17 to offer any obstruction to the restoration of the handle to its normal position. It is not compulsory that the cocking handle be so returned, but it is an advantageous feature that any attempt to return it will have no detrimental consequence.

It will be observed that the wall 20 of the locking member 17, including a portion of the forwardly inclined section of that wall, stands across the lower end of the notch when in unlocking position, as illustrated in Fig. 2 and at a distance forward from the inner end of the notch. When the cross connector 6 is inserted in the notch far enough to engage the wall 20 and be pressed against it, the cross connector turns the locking member, tripping the nose 21 free of the tab 31. The spring thereupon snaps the locking member to the locking position illustrated in Fig. 1.

It will be further observed that in the locking position the locking wall 18 of the locking member 17 extends across the entrance of the notch and lies adjacent the base portion 12 of the clip 11 at the lower side of the notch. The cross connector is therefore held positively in place, there being no possibility of its becoming accidentally detached during operation of the vehicle under the influence of air pressure or other forces tending to cause detachment. This is particularly important in aircraft wipers. The wiper blade can be readily removed from the wiper arm at the will of the user, simply by operating the cocking handle to return the locking member to its unlocked and cocked condition.

The side walls 5 of the hanger 3 extend adjacent the side walls 13 of the clip 11. Thus, there is no substantial freedom for tilting of the clip 11 relative to the hanger 3 about a longitudinal axis nor for turning of the clip relative to the hanger about a fore and aft axis. The wiper blade 8, however, is free to rock about the axis of the cross connector 6, so that it may automatically assume an attitude in which it bears evenly against the windshield throughout its length.

The form of the invention illustrated in Fig. 5 is the same in all respects as that illustrated in Figs. 1 to 4, inclusive, with the exception that the narrow portion of the locking member does not extend so far along the tripping arm 20, the shoulders 20b being located much nearer to the base 19 than are the shoulders 20a in Figs. 1 to 4. The same reference characters have accordingly been applied to corresponding parts, and the detailed description of these parts will not be repeated.

The relocation of the shoulders 20b greatly reduces the capacity for movement of the handle 25 relative to the locking member 17 when the locking member is detained in unlocking position. When the handle has been operated to retract the locking member to unlocking position, as seen in Fig. 5, any attempt manually to return the handle 25 will quickly cause the shoulders 27a to engage the shoulders 20b so that such restoring movement of the handle will be resisted and arrested by the locking member 17. It is an important point, however, that this resistance to restoration of the handle is transmitted through shoulders 20b formed in the base or tripping arm 20 of the locking member. The force is applied as a straight thrust to the tripping arm 20, and not as a bending force as would be the case if the thrust of the handle member were applied to a forward portion of the base 19 or to a portion of the arm 18 of the locking member.

With the construction of Fig. 5, all liability of damage to the locking member is obviated, and at the same time the handle 25 is forced to remain substantially in its fully retracted position and to indicate to the user by reason of its position the fact that the locking member is detained in unlocking position.

I have described what I believe to be the best embodiments of my invention. I do not wish, however, to be confined to the embodiments shown, but what I desire to cover by Letters Patent is set forth in the appended claims.

What is claimed is:

1. In a connector mechanism for use in separably but securely connecting the wiper arm and wiper blade members of a windshield wiper to one another, in combination, a female connector permanently secured to one of the windshield wiper members referred to and adapted to interfittingly engage a complementary male connector carried by the other of the windshield wiper members, a locking member carried by said female connector and movable between a locking position in which it is effective to maintain an interfitting relation of the connectors, and an unlocking position in which said connectors are rendered freely separable, a spring constructed and arranged to urge the locking member to locking position, and to oppose movement thereof to unlocking position, means cooperative with the locking member to detain said member in unlocking position against the force of the spring, and a handle supported by the female connector and having a lost motion connection with the locking member, and being operable in one direction to move the locking member from locking to unlocking position, said handle being free to be moved in the opposite direction relative to the locking member when the locking member is held in unlocking position.

2. In a connector mechanism for use in separably but securely connecting the wiper arm and wiper blade members of a windshield wiper to one another, in combination a body element adapted to be permanently secured to one of the windshield wiper members referred to, said body element including a notch for receiving a cross connector carried by the other of the windshield wiper members, a tiltable locking member which is also a trigger member disposed within the body element, movable transversely of the notch between locking and unlocking positions, said locking member including a locking portion which blocks the notch entrance when in locking position, but which stands clear of the notch entrance when in unlocking position, a spring engaging the locking member and partly supported by the body element and constructed and arranged to urge said member toward locking position, a handle carried by the body element and engageable with the locking member for moving said member bodily from locking to unlocking position, and for concomitantly tilting the locking member forward through the assistance of said spring, said locking member and body element including coacting abutment parts which are brought into effective cooperating engagement by such combined bodily and tilting movements of the locking member to cock the locking member in unlocking position against the restoring force of the spring, and said locking member including a tripping portion which extends across the inner portion of the slot when the locking member is cocked in unlocking position, said tripping portion being adapted to be engaged and displaced by the cross connector to trip the locking member.

3. In a connector mechanism for separably or securely connecting the wiper arm and wiper blade members of a windshield wiper to one another, in combination, a U-shaped clip rigidly secured to one of the windshield wiper members referred to, such clip including rearwardly extending side walls and a transversely extending front wall, and having a notch which extends through the front wall and into the side walls, a cross connector attached to the other of said windshield wiper members and received in said notch, a hook-like locking member disposed within the clip and movable transversely of the notch between locking and unlocking positions, a spring urging the locking member toward locking position, a handle engaged with the locking member to move the locking member from locking to unlocking position, and cooperating abutment parts on the locking member and on the front wall of the clip which are brought into cooperative engagement by movement of the locking member to unlocking position to detain the locking member in unlocking position.

4. In a connector mechanism for separably and securely connecting the wiper arm and wiper blade members of a windshield wiper to one another, in combination, a U-shaped clip rigidly secured to one of the windshield wiper members referred to, said clip including rearwardly extending side walls and a transversely extending front wall, and having a notch which extends through the front wall and into the side walls, a cross connector attached to the other of said windshield wiper members and received in said notch, a hook-like locking member disposed within the clip and movable transversely of the notch between the locking and unlocking positions, a spring urging the locking member toward locking position, a handle having one-way operative engagement with the locking member when the locking member is in locking position, and being operable in one direction to move the locking member from locking to unlocking position, said handle being free to be moved in the opposite direction relative to the locking member when the locking member is detained in unlocking position, and said handle and clip including cooperating abutment portions for determining limits of movement of the handle in both directions, in the one instance to limit withdrawal of the locking member and deformation of the spring, and in the other to arrest the handle in a position clear of the notch.

5. A connector mechanism for use in separably but securely connecting the wiper arm and wiper blade members of a windshield wiper to one another, comprising, in combination, a U-shaped clip rigidly secured to one of the windshield wiper members referred to, said clip including rearwardly extending side walls formed with notches for receiving a cross connector attached to the other of said windshield wiper members and received in said notches, a hook-like locking member disposed within the clip and movable transversely of the notches between locking and unlocking positions, a spring urging the locking member toward locking position, and a handle interlinked with the hook-like locking member to provide a one-way operating connection between them whereby the locking member may be moved by the handle in one direction from locking to unlocking position, said handle being free to be moved in the opposite direction relative to the locking member when the locking member is detained in unlocking position.

6. In a connector mechanism for use in separably but securely connecting the wiper arm and wiper blade members of a windshield wiper to one another a body element adapted to be permanently secured to one of the windshield wiper members referred to and to interfittingly engage a complementary connector element carried by the other of the windshield wiper members, a locking member carried by said body element and movable to and fro between a locking position in which it is effective to maintain an interfitting relation of the body and connector elements, and an unlocking position in which said elements are rendered freely separable, said locking member comprising a locking portion, and a detaining portion, a spring constructed and arranged to engage and act upon the locking member for urging the locking member to locking position and for opposing retraction of the locking member to unlocking position, means cooperative with the detaining portion of the locking member to detain said member in unlocking position against the force of the spring, and an operating handle for the locking member movable in one direction to retract the locking member, said locking member and handle having engageable parts substantially in alignment with the detaining portion of the locking member for limiting movement of the handle relative to the locking member in the opposite direction when the locking member is detained in unlocking position, the construction and arrangement being such that force applied to the handle for moving it in said opposite direction is transmitted as a thrust substantially directly through the detaining portion of the locking member to the detaining means.

7. In a connector mechanism for use in separably but securely connecting the wiper arm and wiper blade members of a windshield wiper to one another a body element adapted to be permanently secured to one of the windshield wiper members referred to and to interfittingly engage a complementary connector element carried by the other of the windshield wiper members, a locking member carried by said body element and movable to and fro between a locking position in which it is effective to maintain an interfitting relation of the body and connector elements, and an unlocking position in which said elements are rendered freely separable, said locking member being of hook-like construction and comprising a locking leg, a detaining leg, and a body portion extending between said legs and connecting them to one another, a spring constructed and arranged to engage and act upon the body portion of the locking member for urging the locking member to locking position and for opposing retraction of the locking member to unlocking position, means cooperative with the detaining leg of the locking member to detain said member in unlocking position against the force of the spring, and a retracting handle movably mounted on the body element and having one-way operative engagement with the locking member at a point remote from the detaining leg thereof, said locking member and handle having engageable parts substantially in alignment with the detaining leg of the locking member for limiting movement of the handle relative to the locking member in the opposite direction.

8. In a connector mechanism for separably but securely connecting the wiper arm and wiper blade members of a windshield wiper to one another, in combination, a U-shaped clip secured to one of the windshield wiper members referred to, such clip including rearwardly extending side walls and a transversely extending front wall, and having a notch which extends through the front wall and into the side walls for receiving a cross connector attached to the other of said windshield wiper members, a hook-like locking member disposed within the clip and movable transversely of the notch between locking and unlocking positions, a spring urging the locking member toward locking position, a handle engaged with the locking member to move the locking member from locking to unlocking position, and cooperating abutment parts on the locking member and on the front wall of the clip which are brought into cooperative engagement by movement of the locking member to unlocking position to detain the locking member in unlocking position.

9. In a connector mechanism for separably but securely connecting the wiper arm and wiper blade members of a windshield wiper to one another, in combination, a U-shaped clip secured to one of the windshield wiper members referred to, said clip including rearwardly extending side walls and a transversely extending front wall, and having a notch which extends through the front wall and into the side walls for receiving a cross connector attached to the other of said windshield wiper members, a hook-like locking member disposed within the clip and movable transversely of the notch between the locking and unlocking positions, a spring urging the locking member toward locking position, a handle having one-way operative engagement with the locking member when the locking member is in locking position, and being operable in one direction to move the locking member from locking to unlocking position, said handle being free to be moved in the opposite direction relative to the locking member when the locking member is detained in unlocking position, and said handle and clip including cooperating abutment portions for determining limits of movement of the handle in both directions, in the one instance to limit withdrawal of the locking member and deformation of the spring, and in the other to arrest the handle in a position clear of the notch.

10. A connection mechanism for use in separably but securely connecting the wiper arm and wiper blade members of a windshield wiper to one another, comprising, in combination, a generally U-shaped clip rigidly secured to one of the windshield wiper members referred to, said clip being provided with abutment means and rearwardly extending side walls formed with notches, a cross connector attached to the other of said windshield wiper members and received in said notches, a hook-like locking member disposed in the clip with capacity both for bodily and rocking movements transversely of the notches between locking and unlocking positions, a spring urging the locking member toward locking position, and a handle interlinked with the locking member to provide a one-way operating connection between them whereby the locking member may be moved by the handle in one direction from locking to unlocking position, said handle being free to be moved in the opposite direction relative to the locking member when the locking member is detained in unlocking position, the line of pull of the handle upon the locking member being displaceable forwardly from the line of thrust of the spring upon the locking member so that the locking member may be moved bodily to engage the abutment means to cock such member in said unlocking position.

THEODORE J. SMULSKI.

REFERENCES CITED

The following references are of record in the file of this patent:

UNITED STATES PATENTS

| Number | Name | Date |
| --- | --- | --- |
| 2,270,589 | Hansen | Jan. 20, 1942 |
| 697,682 | Smith | Apr. 15, 1902 |
| 2,147,113 | Smulski | Feb. 14, 1939 |
| 215,545 | Stamour et al. | May 20, 1879 |

Certificate of Correction

Patent No. 2,432,691. December 16, 1947.

THEODORE J. SMULSKI

It is hereby certified that errors appear in the printed specification of the above numbered patent requiring correction as follows: Column 3, line 9, strike out "ad-"; column 6, line 72, claim 2, after the word "combination" insert a comma; column 7, line 31, claim 3, for "or" read *but*; line 54, claim 4, for "and" read *but*; column 10, line 28, claim 10, for "reecived" read *received*; same column, list of references cited, under "United States Patents" add the following:

| | | |
|---|---|---|
| 1,371,363 | Gillet | Mar. 5, 1921 |
| 741,014 | Covert | Oct. 13, 1903 |
| 1,546,950 | Stuart | July 21, 1925 | and that the said Letters Patent should be read with these corrections therein that the same may conform to the record of the case in the Patent Office.

Signed and sealed this 23rd day of March, A. D. 1948.

[SEAL]

THOMAS F. MURPHY,
*Assistant Commissioner of Patents.*